(12) United States Patent
Kim et al.

(10) Patent No.: US 12,288,903 B2
(45) Date of Patent: Apr. 29, 2025

(54) BATTERY PACK CASE FOR A VEHICLE

(71) Applicants: HYUNDAI MOTOR COMPANY, Seoul (KR); KIA CORPORATION, Seoul (KR)

(72) Inventors: Tae Hyuck Kim, Anyang-si (KR); Jae Hyeon Ju, Seoul (KR); Chang Mo Sung, Gunpo-si (KR); Mee Sun Oh, Hwaseong-si (KR); Min Seok Seo, Gimpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 303 days.

(21) Appl. No.: 17/879,438

(22) Filed: Aug. 2, 2022

(65) Prior Publication Data

US 2023/0146293 A1 May 11, 2023

(30) Foreign Application Priority Data

Nov. 9, 2021 (KR) .................... 10-2021-0152947

(51) Int. Cl.
| | |
|---|---|
| *H01M 50/249* | (2021.01) |
| *B60K 1/04* | (2019.01) |
| *H01M 50/204* | (2021.01) |
| *H01M 50/242* | (2021.01) |
| *H01M 50/264* | (2021.01) |
| *H01M 50/383* | (2021.01) |

(Continued)

(52) U.S. Cl.
CPC ............ *H01M 50/593* (2021.01); *B60K 1/04* (2013.01); *H01M 50/204* (2021.01); *H01M 50/242* (2021.01); *H01M 50/249* (2021.01); *H01M 50/264* (2021.01); *H01M 50/383* (2021.01); *H01M 50/588* (2021.01); *H01M 2220/20* (2013.01)

(58) Field of Classification Search
CPC ............ H01M 50/593; H01M 50/249; H01M 50/242; H01M 50/264; H01M 50/204; H01M 50/588; H01M 50/383; H01M 2220/20; B60K 1/04
USPC ........................................... 180/68.5
See application file for complete search history.

(56) References Cited

U.S. PATENT DOCUMENTS

| | | | |
|---|---|---|---|
| 11,511,612 B2 * | 11/2022 | Jeon ............... | B62D 25/20 |
| 2013/0189567 A1 * | 7/2013 | Yang ............... | H01M 50/103 |
| | | | 429/178 |
| 2020/0373542 A1 * | 11/2020 | Zhang ............. | H01M 50/545 |

(Continued)

FOREIGN PATENT DOCUMENTS

| | | |
|---|---|---|
| KR | 101645715 B1 | 8/2016 |
| KR | 20220036243 A | 3/2022 |

(Continued)

*Primary Examiner* — James A Shriver, II
*Assistant Examiner* — Hilary L Johns
(74) *Attorney, Agent, or Firm* — Lempia Summerfield Katz LLC

(57) ABSTRACT

A battery pack case for a vehicle includes: a lower panel having a battery pack seated to support a lower surface of the battery pack; a recessed part formed on an upper surface of the lower panel and having a groove shape indented downward to extend; and an insulating sheet extending along the recessed part and attached to the recessed part to insulate between the lower panel and the battery pack at a point where the recessed part is formed.

10 Claims, 4 Drawing Sheets

(51) Int. Cl.
*H01M 50/588* (2021.01)
*H01M 50/593* (2021.01)

(56) References Cited

U.S. PATENT DOCUMENTS

| | | | | |
|---|---|---|---|---|
| 2022/0085447 | A1* | 3/2022 | Lee | H01M 50/209 |
| 2022/0094022 | A1* | 3/2022 | Kim | H01M 50/514 |
| 2022/0102798 | A1* | 3/2022 | Son | H01M 50/289 |
| 2022/0109179 | A1* | 4/2022 | Choi | H01M 10/0481 |
| 2022/0118838 | A1* | 4/2022 | Jung | H01M 50/204 |
| 2022/0123399 | A1* | 4/2022 | Kim | H01M 50/502 |
| 2022/0123400 | A1* | 4/2022 | Kim | H01M 50/507 |
| 2022/0123403 | A1* | 4/2022 | Lee | H01M 10/425 |
| 2022/0123415 | A1* | 4/2022 | Shin | H01M 50/211 |
| 2022/0190404 | A1* | 6/2022 | Choi | H01M 10/658 |
| 2022/0190428 | A1* | 6/2022 | Lim | H01M 10/04 |
| 2022/0190430 | A1* | 6/2022 | Oh | B60L 50/64 |
| 2022/0376340 | A1* | 11/2022 | Park | H01M 50/48 |

FOREIGN PATENT DOCUMENTS

| | | | |
|---|---|---|---|
| KR | 20220040869 | A | 3/2022 |
| KR | 20220041470 | A | 4/2022 |
| KR | 20220045353 | A | 4/2022 |
| KR | 20220049946 | A | 4/2022 |
| KR | 20220052181 | A | 4/2022 |
| KR | 20220052182 | A | 4/2022 |
| KR | 20220052183 | A | 4/2022 |
| KR | 20220052184 | A | 4/2022 |
| KR | 20220076567 | A | 6/2022 |
| KR | 20220082590 | A | 6/2022 |
| KR | 20220085396 | A | 6/2022 |

* cited by examiner

BATTERY PACK CASE FOR A VEHICLE

CROSS REFERENCE TO RELATED APPLICATION

This application claims priority to and the benefits of Korean Patent Application No. 10-2021-0152947, filed on Nov. 9, 2021, the entire contents of which are incorporated herein by reference.

BACKGROUND

Field

The present disclosure relates to a battery pack case for a vehicle for preventing fire or thermal runaway from occurring in a battery pack case.

Description of the Related Art

Recently, according to the global trend of reducing carbon dioxide emissions, there is significantly increased demand for electric vehicles that generate driving power by driving a motor with electric energy supplied from an energy storage device such as a battery instead of a typical internal combustion engine vehicle that generates driving power through combustion of a fossil fuel.

In the electric vehicle, a battery is mounted on the lower portion of a vehicle body, and in a structure in which the battery is mounted, a battery module is generally positioned by constituting a pack. In order for the battery module to be fixed to a battery case to be fixed to the vehicle body, the vehicle body for the vehicle is formed with a recessed part recessed.

If a conventional battery pack case for a vehicle is left unattended in a high temperature situation, we have discovered that swelling can occur in a battery cell constituting a battery module, thereby causing damage to a pouch upon venting and assembling the battery cell. When the battery cells are vented or damage to the pouch occurs, the electrolyte of the battery cell is leaked, resulting in a situation in which the electrolyte is gathered in a recessed part formed in the vehicle body. We have found that internal circuits of the battery pack are short-circuited by the electrical connection occurring between a module chassis and a battery pack chassis if the electrolyte is gathered in the recessed part, thereby causing fire or thermal runaway.

The statements in this section are for the purpose of enhancing the understanding of the background of the present disclosure and may not constitute prior art.

SUMMARY

The present disclosure provides a battery pack case for a vehicle for preventing fire or thermal runaway from occurring in a battery pack case by an electrical connection occurring between a module chassis and a battery pack chassis due to the electrolyte if the electrolyte in a battery cell is leaked due to a high temperature situation.

In one embodiment of the present disclosure, a battery pack case for a vehicle includes: a lower panel supporting a lower surface of the battery pack positioned between cross members; a recessed part having a groove shape bent downward and extending from an upper surface of the lower panel; and an insulating sheet attached to the recessed part to insulate between the lower panel and the battery pack. Points other than the recessed part can have a planar shape.

The recessed parts can be formed at a point adjacent to the cross member and a point between the cross members.

An end plate of the battery pack can be positioned in the recessed part.

The end of the end plate can be formed with a protrusion protruding downward.

A gap can be provided between the recessed part and the protrusion.

A support part configured to support the battery packs each other can be formed between the protrusions.

The insulating sheet can be attached to the gap between the recessed part and the support part.

The size of the recessed part can be larger than the size of the support part.

On the upper surface of the lower panel, a gap filler can be applied to the insulating sheet and the insulation sheet can be attached to a region where the gap filler is not applied.

The insulating sheet can be made of a fireproof material.

According to the battery pack case for the vehicle according to the present disclosure, it is possible to prevent fire or thermal runaway from occurring in the battery pack case by an electrical connection occurring between the module chassis and the battery pack chassis due to the electrolyte if the electrolyte in the battery cell is leaked due to the high temperature situation.

The effects that can be obtained from the present disclosure are not limited to the aforementioned effects, and other effects not mentioned should be able to be clearly understood to those having ordinary skill in the art to which the present disclosure pertains from the following description.

BRIEF DESCRIPTION OF THE DRAWINGS

The above and other objects, features and other advantages of the present disclosure should be clearly understood from the following detailed description when taken in conjunction with the accompanying drawings, in which.

Figure 1:
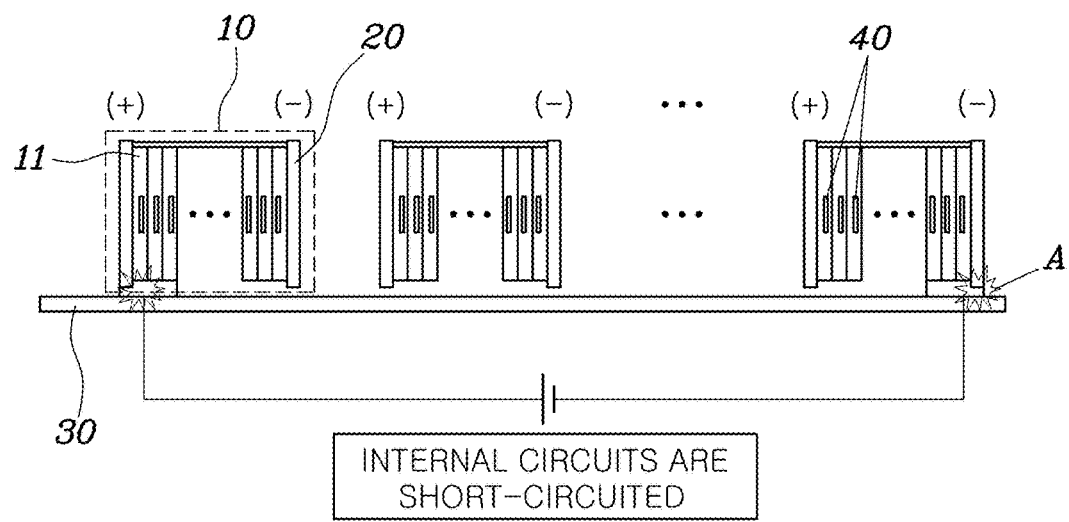
FIG. 1 is a diagram showing a battery pack case for a vehicle according to one embodiment of the present disclosure.

The drawings described herein are for illustration purposes only and are not intended to limit the scope of the present disclosure in any way.

DETAILED DESCRIPTION OF THE DISCLOSURE

Specific structural or functional descriptions of the exemplary embodiments of the present disclosure are only illustrated for the purpose of describing the exemplary embodiments according to the present disclosure, and the exemplary embodiments according to the present disclosure can be embodied in various forms and it should not be construed that the present disclosure is limited to the exemplary embodiments described in the present disclosure.

Since the embodiments according to the present disclosure can be variously changed and can have various forms, specific embodiments shown in the drawings and described in detail in the present specification or application are not intended to limit the concept of the present disclosure to the specific embodiments. Instead, it should be understood to include all changes, equivalents, or substitutes included in the spirit and scope of the present disclosure.

Unless defined otherwise, all terms including technical or scientific terms used herein have the same meaning as commonly understood by those skilled in the art to which the present disclosure pertains. The terms defined in the dictionary commonly used should be interpreted as having a meaning consistent with the meaning in the context of the related technology, and should not be interpreted as an ideal or excessively formal meaning, unless clearly defined in the present specification.

When a component, device, element, or the like of the present disclosure is described as having a purpose or performing an operation, function, or the like, the component, device, or element should be considered herein as being "configured to" meet that purpose or to perform that operation or function.

Hereinafter, the present disclosure are below described in detail by describing exemplary embodiments of the present disclosure with reference to drawings. The same reference numerals presented in each drawing indicate the same members.

Figure 2:
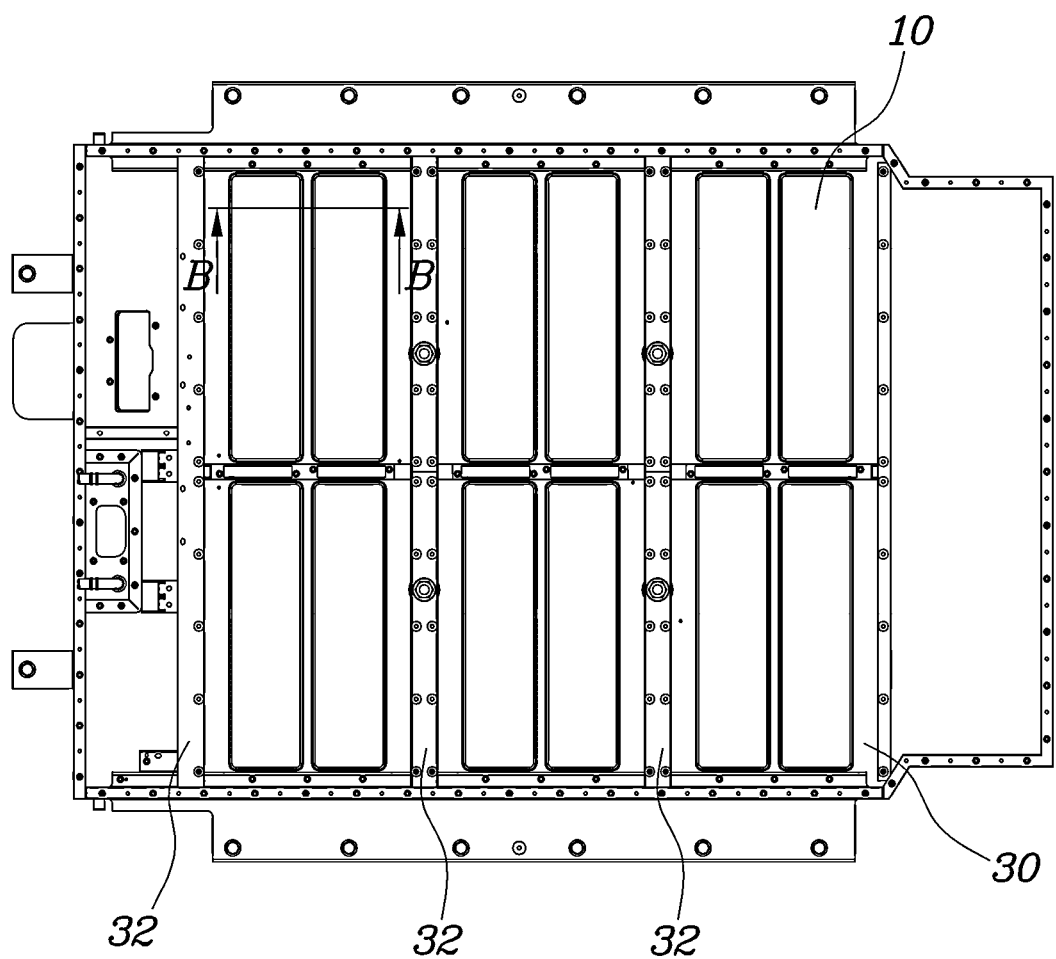
FIG. 2 is a diagram showing the battery pack case for the vehicle shown in FIG. 1 viewed from the top.
Figure 3:
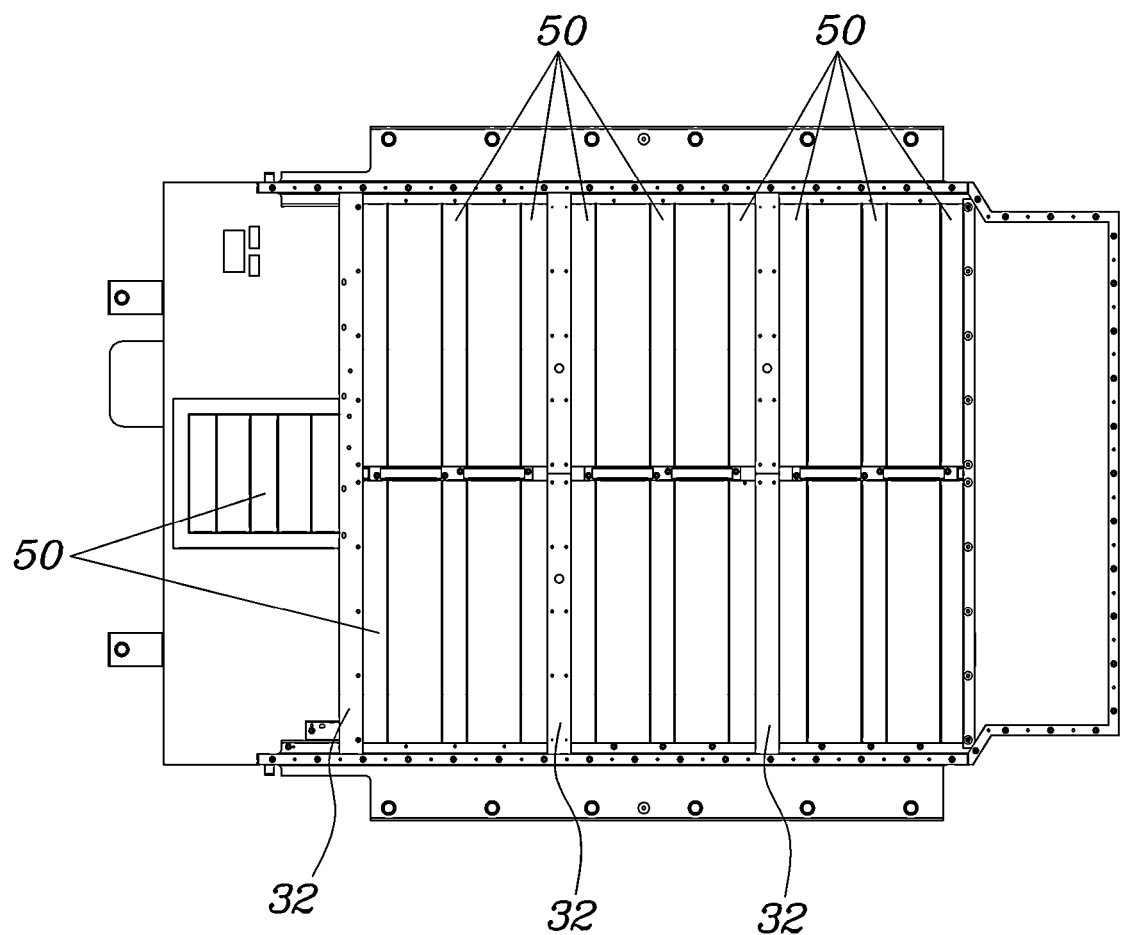
FIG. 3 is a diagram showing a state where an insulating sheet constituting the battery pack case is attached according to one embodiment of the present disclosure.
Figure 4:
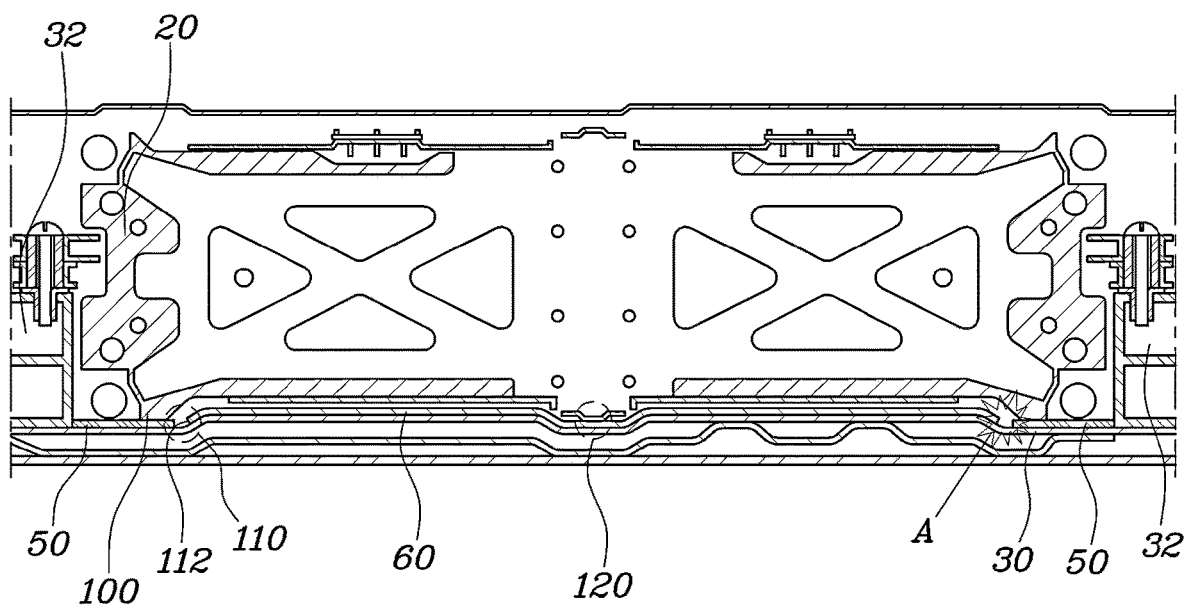
FIG. 4 is a cross-sectional diagram showing a B-B cross section of the battery pack case for the vehicle shown in FIG. 2.

FIG. 1 is a diagram showing a battery pack case for a vehicle according to one embodiment of the present disclosure. FIG. 2 is a diagram showing the battery pack case for the vehicle shown in FIG. 1 viewed from the top. FIG. 3 is a diagram showing a state where an insulating sheet constituting the battery pack case for the vehicle is attached in one form of the present disclosure. FIG. 4 is a cross-sectional diagram showing a B-B cross section of the battery pack case for the vehicle shown in FIG. 2.

FIG. 1 is a diagram showing a battery pack case for a vehicle according to one embodiment of the present disclosure.

Referring to FIG. 1, the battery pack case for a vehicle includes: a lower panel 30 supporting a lower surface of the battery pack positioned between cross members 32; a recessed part 110 having a groove shape 112 bent downward and extending from an upper surface of the lower panel 30; and an insulating sheet 50 attached to the recessed part 110 to insulate between the lower panel 30 and the battery pack.

The present disclosure inhibits or prevents circuits of a battery cell 11 from being short-circuited by an electrical connection occurring between a module chassis and a battery pack chassis due to the electrolyte if the electrolyte of the battery cell 11 is leaked. For a battery, several cells are gathered to form a module, and the modules are gathered to form a pack.

In one embodiment, the battery includes a plurality of battery modules 10 each of which includes a plurality of battery cells 11, and an electrical signal is delivered from each battery module as shown in FIGS. 1, 2 and 3.

The plurality of battery modules are positioned on the rear of the vehicle and may include a first battery module 10 and a last battery module 10. Arc may occur in the vehicle when the largest potential difference occurs in the first battery module 10 and the last battery module 10.

In general, if the vehicle is left unattended in a high temperature situation, swelling can occur in the battery cell 11 constituting the battery module, thereby causing damage to a pouch upon venting and assembling the battery cell 11. When the battery cell 11 is vented and damage to the pouch occurs, the electrolyte of the battery cell 11 is leaked, thereby causing a situation in which the electrolyte is gathered in the recessed part 110 formed in the vehicle body.

Therefore, when an arc generation point (A) is insulated, it is possible to prevent the internal circuits of the battery pack from being short-circuited by the electrical connection occurring between the module chassis and the battery pack chassis because the electrolyte is gathered in the recessed part 110, thereby preventing fire or thermal runaway.

Specifically, the lower panel 30 has the battery pack seated to support the lower surface of the battery pack. The lower panel 30 is formed in a planar shape to support the battery pack, which has a plurality of battery modules 10. In addition, end plates 20 are provided on both ends of the battery module 10 to protect the battery cell 11. The end plate 20 can prevent the battery cell 11 from being in direct contract with the vehicle body on both ends of each battery module 10. Each battery cell 11 can form a battery cell tab 40 on the side surface thereof, and can not only transmit and receive the electrical signal between the battery cells 11 through the battery cell tab 40 but also transmit and receive the electrical signal between the battery modules 10.

In addition, the end plate 20 of the battery pack can be formed with a protrusion 100 protruding downward. The protrusions 100 formed on the ends of both sides of the end plate 20 can be fixed through the recessed part 110, and the protrusion 100 and the recessed part 110 are fixed by positioning the end of the end plate 20 in the recessed part 110.

In addition, the recessed part 110 is formed in the upper surface of the lower panel 30, and in a groove shape 112 indented downward to extend. The recessed part 110 is in contact with the downward protruding part formed on the lower panel 30 so that the lower panel 30 can be seated, and points other than the recessed part 110 can have a planar shape. The recessed part 110 can have a planar potion indented once in a width direction of the battery pack, and the shape of the planar portion is illustrative and is not necessarily limited thereto.

The part other than the recessed part 110 is formed in a planar shape to secure stability against shaking of the battery pack and therefore, a gap capable of absorbing shock is generated. Therefore, it is possible to not only have rigidity against external impact, but also to withstand deformation due to the swelling of the battery cell 11.

FIG. 4 is a cross-sectional diagram showing a B-B cross section of the battery pack case for the vehicle shown in FIG. 2.

Referring to FIG. 4, a gap can be provided between the recessed part 110 and the protrusion 100 or between the recessed part 110 and a support part 120. The support part 120 is a part formed between the protrusions 100, and can serve to support the battery pack between the protrusions 100. The support part 120 is also referred to as a clamp of the battery module 10.

The support part 120 can be fastened to a groove shape indented downward to extend to have stability against shaking of the battery pack, and can connect a plurality of battery modules 10 to one battery pack.

Although the possibility of an arc being generated would be the highest when the greatest potential difference occurs between the first battery module 10 and the last battery module 10, there is a possibility of an arc being generated at the support part 120 because the plurality of battery modules 10 are also adjacent to each other to deliver the electrical signal. Therefore, the insulating sheet 50 also needs to be attached to the support part 120 formed between the protrusions 100 of the end plate 20.

In addition, the size of the recessed part 110 can be larger than the size of the support part 120. The recessed part 110 should be configured to form a stable structure so that the support part 120, the protrusion 100 of the end plate 20, and the lower panel 30 are seated to fix the battery for the vehicle.

At this time, when the recessed part 110 to which the insulating sheet 50 is attached is formed to be larger than the size of the support part 120 to which the plurality of battery modules 10 are adjacent, it is possible to reduce the probability of the short circuit of the circuit of the battery cell 11 due to the leaked electrolyte, and to have design advantages.

FIG. 3 is a diagram showing that the insulating sheet 50 constituting the battery pack case for the vehicle is attached.

Referring to FIG. 3, the insulating sheet 50 extends along the recessed part 110 and is attached to the recessed part 110 to insulate between the lower panel 30 and the battery pack at the point where the recessed part 110 is formed. The insulating sheet 50 can be made of a thin fireproof material that does not burn easily even at high temperature to prevent the circuit of the battery cell 11 from being short-circuited by the electric connection caused by the electrolyte if the electrolyte of the battery cell 11 is leaked, which is illustrative and is not necessarily limited thereto.

In addition, the insulating sheet 50 can be made of an insulating material that does not pass electricity or heat to insulate between the lower panel 30 and the battery pack. The insulating sheet 50 can be attached to the recessed part 110 to increase an insulating distance, and the insulation property can be strengthened according to the increased insulating distance.

In addition, the insulating sheet 50 can be attached to the gap between the recessed part 110 and the support part 120. The recessed part 110 and the support part 120 can form the gap in the battery pack case, and if the electrolyte leaked from the battery cell 11 is introduced through the support part 120 formed between the protrusions 100, the insulating sheet 50 can insulate between the lower panel 30 and the battery pack.

In addition, on the upper surface of the lower panel 30, a gap filler 60 can be applied to the insulating sheet 50 and the insulating sheet 50 can be attached to a region where the gap filler 60 is not applied. The gap filler 60 is made of a material that is a heat transfer interface material and has excellent thermal conductivity and flexibility with heat dissipation and fixing functions, and can discharge heat by filling a minute gap or space and protect the battery cell 11 from shock. In this battery pack case, the insulating sheet 50 can be attached to the recessed part 110 in the part to which the gap filler 60 is not attached, and the gap filler 60 and the insulating sheet 50 do not completely contact each other and can be disposed to be spaced apart from each other by a certain interval.

FIG. 2 is a diagram showing the battery pack case for the vehicle shown in FIG. 1 viewed from the top.

Cross members 32 extending in the width direction can be disposed to be spaced apart from each other. Referring to FIG. 2, a part connected to the vehicle body for the vehicle with a bolt on the side surface of the battery pack is the cross member 32. The cross member 32 can fix the battery pack on the side surface and is connected to a vehicle frame to serve to increase the rigidity of the vehicle body. A plurality of cross members 32 can be provided, and the number thereof is not limited to three as shown in FIG. 2, but more cross members can be provided according to the size of the vehicle.

In addition, the battery pack can be positioned between the cross members 32. Since the cross members 32 extending in the width direction are disposed to be spaced apart from each other, the battery pack can be fixed between the spaced spaces.

In addition, the recessed part 110 can be formed at a point adjacent to the cross member 32 and at a point between the cross members 32. To prevent the circuits of the battery cell 11 from being short-circuited by the occurrence of the electrical connection by attaching the insulating sheet 50 configured to insulate between the lower panel 30 and the battery pack to the recessed part 110, the electrolyte can be leaked and gathered in the parts other than the cross member part that is parts through which the electrolyte is not leaked and the part where the battery module 10 is positioned.

Therefore, to prevent the electrolyte from being leaked and gathered at the corners meeting the cross member, the recessed parts 110 can be positioned at the point adjacent to the cross member and the point between the cross members so that the insulating sheet 50 is attached to the recessed part 110.

As a result, it is possible to inhibit or prevent fire or thermal runaway from occurring in the battery pack case by the electrical connection occurring between the module chassis and the battery pack chassis due to the electrolyte if the electrolyte of the battery cell is leaked due to the high temperature situation.

While the specific exemplary embodiments of the present disclosure have been shown and described, it should be apparent to those having ordinary skill in the art that the present disclosure can be variously improved and changed without departing from the technical spirit of the present disclosure.

What is claimed is:

1. A battery pack case for a vehicle, comprising:
a lower panel supporting a lower surface of the battery pack positioned between cross members;
a recessed part having a groove shape bent downward and extending from an upper surface of the lower panel; and
an insulating sheet attached to the recessed part and configured to insulate between the lower panel and the battery pack,
wherein the recessed part is formed at a point adjacent to the cross members and a point between the cross members,
wherein a gap is formed between an upper surface of the recessed part and the lower surface of the battery pack,
wherein the insulating sheet is placed in the gap and attached to the lower panel, and
wherein the insulating sheet insulates the lower panel and the battery pack from electrolyte leaked from the battery pack.

2. The battery pack case of claim 1,
wherein points other than the recessed part have a planar shape.

3. The battery pack case of claim 1,
wherein an end plate of the battery pack is positioned in the recessed part.

4. The battery pack case of claim 3,
wherein an end of the end plate is formed with a protrusion protruding downward.

5. The battery pack case of claim 4,
wherein a gap is provided between the recessed part and the protrusion.

6. The battery pack case of claim 4,
wherein a support part configured to support the battery packs each other is formed between the protrusions.

7. The battery pack case of claim 6,
wherein the insulating sheet is attached to a gap between the recessed part and the support part.

8. The battery pack case of claim 6,
wherein a size of the recessed part is larger than a size of the support part.

9. The battery pack case of claim 1,
wherein on the upper surface of the lower panel, a gap filler is applied to the insulating sheet and the insulation sheet is attached to a region where the gap filler is not applied.

10. The battery pack case of claim 1,
wherein the insulating sheet is made of a fireproof material.

* * * * *

UNITED STATES PATENT AND TRADEMARK OFFICE
CERTIFICATE OF CORRECTION

PATENT NO. : 12,288,903 B2  
APPLICATION NO. : 17/879438  
DATED : April 29, 2025  
INVENTOR(S) : Tae Hyuck Kim et al.

Page 1 of 1

It is certified that error appears in the above-identified patent and that said Letters Patent is hereby corrected as shown below:

On the Title Page

Item [72], Tae Hyuck Kim, "Anyang-si (KR)" should be replaced with "Asan-si (KR)"

Signed and Sealed this  
Eleventh Day of November, 2025

John A. Squires  
*Director of the United States Patent and Trademark Office*